United States Patent [19]

Saitou

[11] 4,086,635
[45] Apr. 25, 1978

[54] RECORDING AND REPRODUCING APPARATUS WITH TAPE SEED DEPENDENT ON HEAD SELECTION

[75] Inventor: Sinichi Saitou, Hachioji, Japan

[73] Assignee: Olympus Optical Co., Ltd., Tokyo, Japan

[21] Appl. No.: 645,440

[22] Filed: Dec. 30, 1975

[51] Int. Cl.² ............... G11B 15/10; G11B 15/44; G11B 19/18
[52] U.S. Cl. ............................. 360/73; 318/305; 360/62; 360/63
[58] Field of Search ............ 360/73, 71, 69, 63, 360/27, 62; 318/305, 467

[56] References Cited

U.S. PATENT DOCUMENTS

| | | | |
|---|---|---|---|
| 3,348,113 | 10/1967 | Vichr | 318/305 |
| 3,573,393 | 4/1971 | Blackie et al. | 360/74 |
| 3,665,117 | 5/1972 | Staar | 360/71 |
| 3,711,657 | 1/1973 | Niioka et al. | 360/71 |
| 3,721,774 | 3/1973 | Yonemoto et al. | 360/72 |

Primary Examiner—Alfred H. Eddleman

[57] ABSTRACT

A tape recorder comprises a plurality of recording and reproducing heads each arranged for a corresponding one of a plurality of recording tracks, means for setting different recording speeds specified for the respective recording tracks, and means for setting a reproducing speed at the speed specified for a corresponding one of the recording tracks in response to a reproduction signal produced from the recording and reproducing head.

4 Claims, 1 Drawing Figure

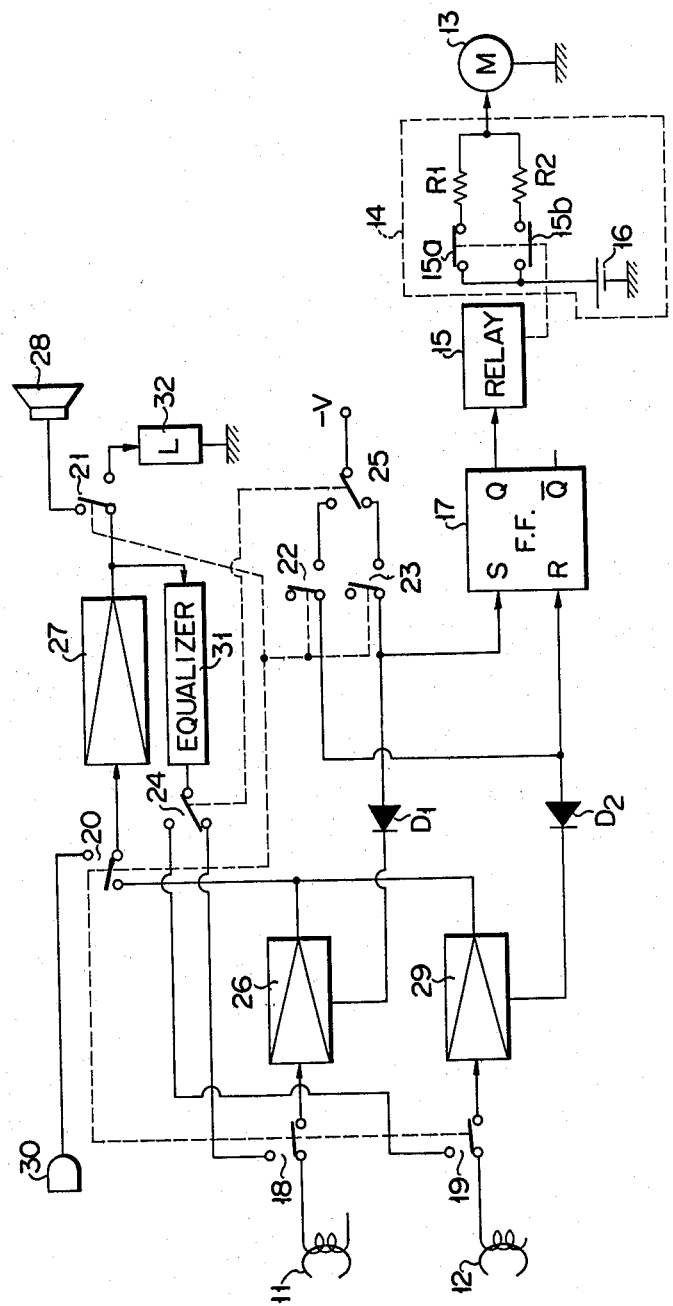

RECORDING AND REPRODUCING APPARATUS WITH TAPE SEED DEPENDENT ON HEAD SELECTION

BACKGROUND OF THE INVENTION

This invention relates to a recording and reproducing apparatus which performs a recording and reproducing operation at a different speed for each recording track.

There are some recording and reproducing apparatus such as a tape recorder in which the recording and reproducing speed can be selectively set at various operation speeds, for example, at two operation speeds including a low speed of 1.2 cm/sec. and a high speed of 2.4 cm/sec.

With such a tape recorder, it is gernerally unclear at what speed the tape has been recorded. Therefore, in order to correctly reproduce sound signal recorded on the tape, it is necessary to carry out a trial and error method by driving the tape at a given tape speed to find at what speed the tape should be reproduced. When the normal sound is heard at a certain tape speed, the tape speed is understood to be the required reproducing speed and then the reproducing speed can be set to continue the reproducing operation.

Thus, it is extremely troublesome to correctly select the required tape speed for reproduction. As described above, it is possible to detect the correct tape speed when voice or sound is recorded on the tape. However, when the signal recorded on the tape is not sound signal but, for example, an analog data signal, it is extremely difficult to detect the required tape speed and a correct data signal is not obtained when the tape is driven for reproduction at a speed other than the tape speed at which the tape is recorded.

SUMMARY OF THE INVENTION

It is an object of this invention to provide a recording and reproducing apparatus in which a reproducing speed can be automatically set at a recording speed.

According to one aspect of this invention, there is provided a recording and reproducing apparatus comprising a plurality recording and reproducing heads arranged for a corresponding number of recording tracks, means for setting a recording speed specified for each of the plurality of recording tracks, and means responsive to a reproduction signal produced from the recording and reproducing head to set a reproducing speed at the recording speed specified for the corresponding track.

BRIEF DESCRIPTION OF THE DRAWING

The accompanying drawing is a block circuit diagram of a recording and reproducing apparatus according to an embodiment of this invention which is applied to a tape recorder.

DETAILED DESCRIPTION OF THE INVENTION

An embodiment of this invention is shown in the accompanying drawing in the form of a tape recorder. The tape recorder employs a magnetic tape (not shown) with two recording tracks and includes two magnetic recording and reproducing heads 11 and 12 arranged for the first and second recording tracks of the tape, repsectively. The magnetic tape having first and second recording tracks facing the magnetic heads 11 and 12 respectively is driven at two different speeds by, for example, a D.C. motor 13. For example, the motor 13 is controlled by a speed control circuit 14 to drive the magnetic tape at a speed of 1.2 cm/sec. where the recording and reproducing operation by the magnetic recording and reproducing head 11 is effected on the first recording track of the tape, and to drive the tape at a speed of 2.4 cm/sec. where the recording and reproducing operation by the magnetic head 12 is effected on the second recording track of the tape. The control circuit 14 varies a driving voltage applied to the motor 13 through resistors R1 and R2 to control the operation speed of the motor 13. When the motor 13 is supplied with an electric power from a D.C. power source 16 through the resistor R1 and a normally closed contact 15a of a relay 15 the motor 13 rotates at a proper speed to drive the tape at a speed of 2.4 cm/sec., and when the driving voltage is applied to the motor 13 through a normally open contact 15b of the relay 15 and the resistor R2 the motor 13 is rotated at a different speed to drive the tape at a speed of 1.2 cm/sec. A set output signal Q of a flip-flop circuit 17 energizes the relay 17 to close the normally open contact 15b, and when the flip-flop circuit 17 is reset the relay 15 is not energized to maintain the normally closed contact 15a in a closed position.

Further, the tape recorder is provided with six recording and reproducing selection switches 18, 19, 20, 21, 22 and 23 interlocked with one another and two tape speed selection switches 24 and 25 interlocked with each other. In the drawing, the recording and reproducing selection switches 18 to 23 are set at the reproducing contact position and the tape speed selection switches 24 and 25 are set at the 1.2 cm/sec. tape speed contact position.

In a reproducing operation, a signal reproduced by the magnetic head 11 is supplied through the switch 18 to the amplifier 26 for amplification. An output signal of the amplifier 26 is applied to another amplifier 27 through the switch 20 and then fed to a loud-speaker 28. The output signal of the amplifier 26 is also applied to a set terminal of the flip-flop circuit 17. On the other hand, a signal reproduced by the magnetic head 12 is supplied to the amplifier 29 through the switch 19. Like the output signal of the amplifier 26, an output signal of the amplifier 29 is supplied to the amplifier 27 through the switch 20 and at the same time it is applied through a diode D2 to a reset terminal of the flip-flop circuit 17.

In a recording operation, the switches 18 to 23 are set at the recording contact position different from the reproducing contact position shown in the drawing. Assume that at this time, the tape speed selection switches 24 and 25 are set in the position shown in the drawing. Then, a signal from a signal source, for example, a microphone 30 is fed through the switch 20 to the amplifier 27. The signal amplified by the amplifier 27 is applied to an equalizer 31 and is processed so that it can be properly recorded on the tape. An output signal of the equalizer 31 is applied to the magnetic head 11 through the switches 24 and 18 and is recorded on the first track of the magnetic tape which is driven in proximity to or in contact with the magnetic head 11 by the motor 13. Since, at this time, the set terminal of the flip-flop circuit 17 is connected to a voltage source −V through the switches 25 and 23, the relay 15 is energized to close the normally open contact 15b is descibed before, causing the motor 13 to drive the tape at a speed of 1.2 cm/sec. Thus, when the switches 24 and 25 are set in the position shown in the drawing, the recording operation by the head 11 is effected on the first track of the tape at a speed of 1.2 cm/sec.

Where the switches 24 and 25 are set at the contact position different from the 1.2 cm/sec. tape speed contact position, an output signal of the equalizer 31 is applied to the magnetic head 12 through the switches 24 and 19 and is recorded on the second track of the magnetic tape. In this case, the power source —V is connected to the reset terminal of the flip-flop circuit 17 through the switches 25 and 22 to reset the flip-flop circuit 17. Therefore, the relay 15 is not energized and consequently the motor 13 is rotated to drive the tape at a speed of 2.4 cm/sec. Thus, the recording operation by the magnetic head 12 is effected on the second track of the tape at a speed of 2.4 cm/sec.

In a recording operation, the output signal of the amplifier 27 is also supplied to a load 32 through the switch 21. The load 32 is, for example, a monitor for acoustically or visually expressing the information while it is recorded. For clarifying explanation, an erasing head, erasing circuit, record biasing circuit and the like are not shown in the drawing but, in practice, well known devices can be used as the above head and circuits.

In a reproducing operation, since the selection switches 18 and 23 are set at the reproducing contact position as shown in the drawing the power source —V is disconnected from the flip-flop circuit 17 by the switches 22 and 23 irrespective of the contact position of the switch 25. Therefore, in the reproducing operation, the tape speed is not determined on the basis of the power source —V. As described before, in the reproducing operation, the tape speed is determined by a signal which is reproduced from the magnetic head 11 and 12 and supplied to the set or reset terminal of the flip-flop circuit 17 through the amplifier 26 or 29 and the diode D1 or D2. For example, where information is recorded on the first track of the tape, since the flip-flop circuit 17 is set in response to a signal reproduced from the head 11, the tape speed is set at 1.2 cm/sec. On the other hand, where information is recorded on the second track of the tape, since the flip-flop circuit 17 is reset, the tape speed is set at 2.4 cm/sec.

As described above, the proper tape speed can be automatically determined, preventing the reproducing operation from being effected at an incorrect tape speed. Further, it is not necessary to manually select the tape speed, leading to an extremely simple operation of the tape recorder.

In the above embodiment, a magnetic tape with two recording tracks is used but a magnetic tape with more than two tracks can be used by arranging a recording and reproducing head for each additional track. Further, it is also possible to apply this invention to a recording and reproducing apparatus in which information can be recorded on a plurality of tracks of a recording meduim other than a magnetic tape.

What is claimed is:

1. A recording and reproducing apparatus comprising a plurality of recording and reproducing heads arranged for a corresponding number of recording tracks; a recording speed setting means including a switch for manually setting a recording speed specified for each of said tracks, said recording speed setting means including a flip-flop circuit, a first means for setting said flip-flop circuit when said recording speed setting means set a first recording speed, a second means for resetting said flip-flop circuit when said recording speed setting means set a second recording speed, and a speed control circuit for driving a recording medium at said frst or second recording speed in accordance with outputs of said flip-flop circuit; and a reproducing speed setting means including means for supplying a reproduction signal produced from a first one of said plurality of recording and reproducing heads to a set terminal of said flip-flop circuit and for supplying a reproduction signal produced from a second one of said plurality of recording and reproducing heads to a reset terminal of said flip-flop circuit.

2. The recording and reproducing apparatus according to claim 1 further comprising a motor for driving a recording medium and wherein said speed control circuit includes a normally closed contact which is opened when said relay is energized, a normally open contact which is closed when said relay is energized, a first resistor connected between said normally closed contact and said motor, a second resistor connected between said normally open contact and said motor, and a power source for driving said motor through said normally open or closed contact.

3. A recording and reproducing apparatus comprising a first magnetic recording and reproducing head, a first recording and reproducing selection switch connected to said first magnetic head, a first amplifier connected to said first selection switch to amplify a reproduction signal supplied through said first selection switch in a reproducing operation, a second recording and reproducing head, a second magnetic recording and reproducing selection switch connected to said second magnetic head, a second amplifier connected to said second selection switch to amplify a reproduction signal supplied through said second selection switch in a reproducing operation, a third recording and reproducing selection switch connected to receive output signals of said first and second amplifiers, a third amplifier connected to said third selection switch, a loud-speaker for generating a reproduced sound in response to an output signal of said third amplifier, a first diode connected to the output of said first ampifier, a second diode connected to the output of said second amplifier, a flip-flop circuit having a set terminal connected to said first diode and a reset terminal connected to said second diode, a first means for selectively supplying a signal to the set and reset terminals of said flip-flop circuit, a relay connected to a set output terminal of said flip-flop circuit, a speed control circuit for controlling a speed of a motor for driving a recording medium in response to an output signal of said relay, a signal source which is connected to said third amplifier through said third selection switch in a recording operation, an equalizer for processing an output signal from said third amplifier, and a second means for selectively supplying an output signal from said equalizer to said first and second magnetic recording and reproducing heads in a recording operation.

4. The recording and reproducing apparatus according to claim 3 further comprising a third means for monitoring an output signal of said third amplifier in a recording operation.

* * * * *